Feb. 17, 1942.  E. W. MOXHAM  2,273,494
STALL PARTITION
Filed July 8, 1941  2 Sheets-Sheet 1
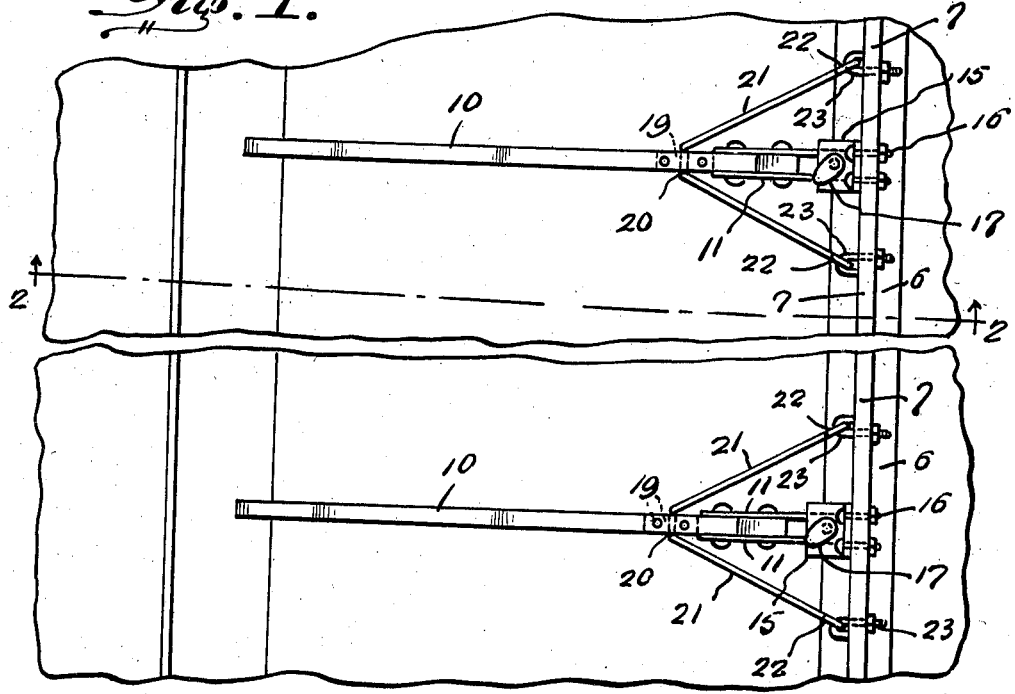
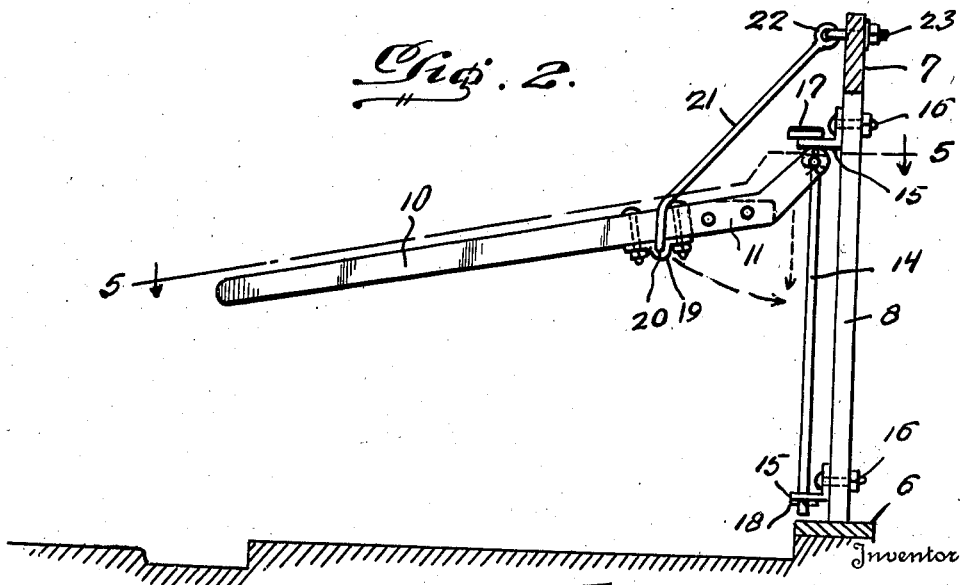
Inventor
Ernest W. Moxham,
By McMorrow & Berman
Attorneys Feb. 17, 1942. E. W. MOXHAM 2,273,494
STALL PARTITION
Filed July 8, 1941 2 Sheets-Sheet 2
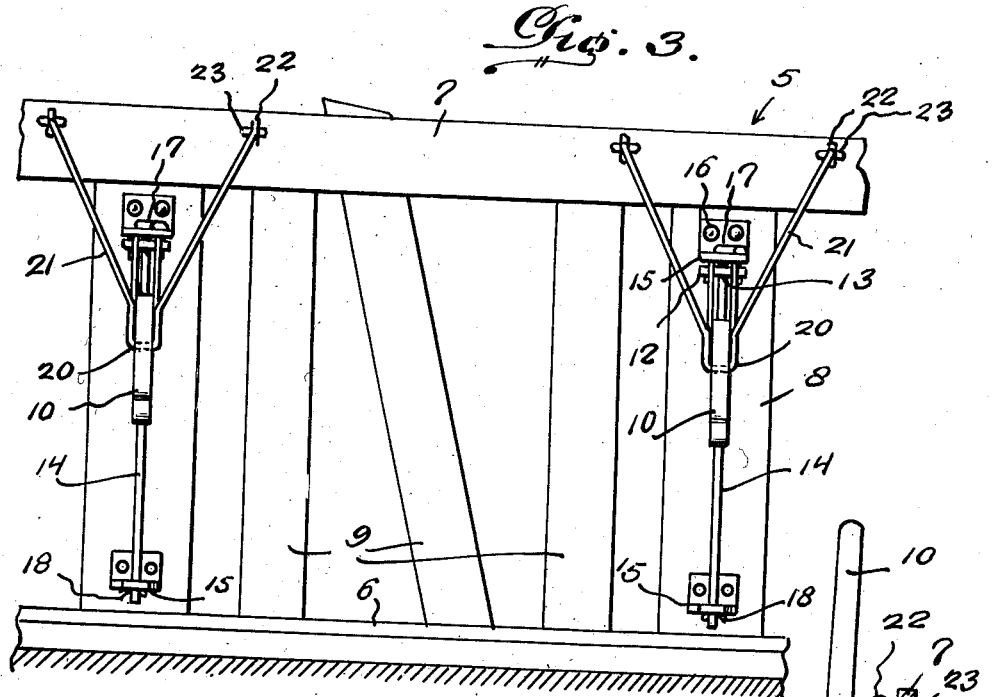
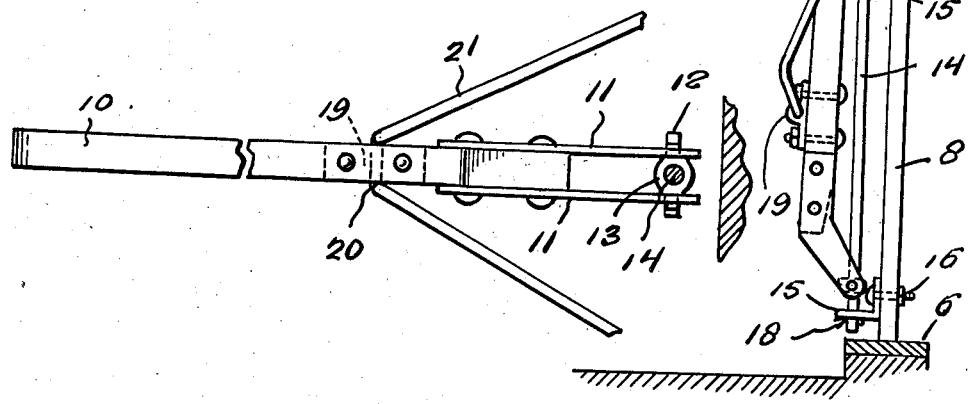
Inventor
Ernest W. Moxham, Patented Feb. 17, 1942

2,273,494

UNITED STATES PATENT OFFICE 2,273,494

STALL PARTITION

Ernest W. Moxham, North Blenheim, N. Y.

Application July 8, 1941, Serial No. 491,486

2 Claims. (Cl. 119—15)

My invention relates to stall partitions for stanchions.

One of the principal objects of my invention is to provide a stanchion partition which may be raised while the animals are being secured to the stanchions and thereafter lowered to provide means for separating the animals, said partitions being also raised when the animals are to be released to permit them to turn easily for exit from the place of confinement or away from the stanchions.

Another object of my invention is to provide an adjustable stall partition capable of being readily attached to stanchions already in use and which is simple in construction, durable in use, efficient in operation and economical in manufacture.

With the above and other objects in view, as will hereinafter appear, the invention consists in the combination, and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views:

Figure 1 is a top plan view of my invention.

Figure 2 is a sectional view taken on the line 2—2 of Figure 1.

Figure 3 is a rear view of my invention.

Figure 4 is a view similar to Figure 2 but illustrating the partition or bar in raised position.

Figure 5 is a sectional view taken on the line 5—5 of Figure 2.

In practising my invention, as illustrated in the drawings, I provide a stanchion frame 5 having a base 6 and a head-rail 7, the latter being spaced over said base by means of vertical spaced standards 8. Disposed between the standards 8 are a plurality of vertical stanchion rails 9 with one of said rails 9, between each pair of standards, being movably mounted, as is customary, for co-action with an adjacent rail 9 for securing the head of an animal to the frame 5.

In order to maintain the animals separated from each other, each standard has secured thereto an adjustable partition or bar 10. Inasmuch as the bars 10 and their associated parts are of an identical construction, a detailed description of one will suffice, it being understood that the reference characters indicative of parts of one are indicative of like parts of the other.

One end of the bar 10 has fixed thereto and extending angularly therefrom a pair of plates 11, the free ends of said plates having rotatably journaled therethrough trunnions 12 fixed to a collar 13 disposed between said plates and slidably mounted upon a vertical rod 14. The upper and lower ends of the rod 14 are mounted within upper and lower L-shaped brackets 15 secured to the standards 8 by means of bolts and nuts 16 and adjacent the upper and lower ends respectively of said standards. The upper end of said rod 14 is provided with a head 17 overlying the upper bracket 15 while the lower end of said rod has extending therethrough a cotter pin 18 underlying the lower bracket 15. Obviously, by removing the pin 18, the rod may be withdrawn upwardly and out of the brackets 15 and thus effect disengagement of the collar 13 and bar 10 from the standard 8. A reverse operation serves to effect attachment of the bar 10 to the standard 8. The lower or underface of the bar 10, adjacent its mounted end, has secured thereto a bearing block 19 through which extends the cross portion or front end 20 of a substantially V-shaped yoke 21, the free ends of said yoke being provided with eyes 22 pivotally connected to eye-bolts 23 carried by the head rail 7 superjacent and laterally of the standard 8 as clearly illustrated in the drawings.

The cross portion 20 of the yoke 21 is pivotally mounted in the block 19 whereby, when the parts are in the positions illustrated in Figure 4 of the drawings, the collar 13 may be raised upwardly on the rod 14 to dispose the plates 11 in engagement with the upper bracket 15 as clearly illustrated in Figure 2 thus providing a partition between the animals. A reverse operation serves to reposition the bar 10 in a substantially vertical position to permit the animals to turn and pass easily from the stall. By removing the eye-bolts 23 from the head rail 7 and rod 14, as heretofore described, the entire device may be removed from the stanchion frame.

Owing to the connection of the yoke 21 with the bar being closer to the mounted end of said bar than to the free end of the bar, the latter will tend to hold the position as shown in Figure 2, the free end of the bar being limited from downward movement beyond said position by the plates 11 contacting the upper bracket 15.

While I have described my invention as being adaptable for utilization in connection with animals generally, it is particularly useful in connection with the stabling of cows, especially during milking.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. In a stanchion partition, superimposed spaced brackets secured on the stanchion, a rod removably mounted on the stanchion by said brackets and arranged vertically, a partition bar, plates secured to one end of said bar and extending angularly thereto, a collar slidable on the rod and pivoted to said plates whereby said bar may assume vertical and horizontal positions, and a yoke journaled on said bar adjacent said plates and hinged to the stanchion.

2. In a stanchion partition, superimposed spaced brackets secured on the stanchion, a rod removably mounted on the stanchion by said brackets and arranged vertically, a partition bar, plates secured to one end of said bar and extending angularly thereto, a collar slidable on the rod and pivoted to said plates whereby said bar may assume vertical and horizontal positions, and a substantially V-shaped yoke including a connecting portion and diverging arms and having the connecting portion journaled on the bar adjacent said plates and having the free ends of the arms hinged on said stanchion in a plane above the uppermost bracket.

ERNEST W. MOXHAM.